E. A. GRAHAM.
ELECTRICAL TRANSMITTING AND INDICATING APPARATUS.
APPLICATION FILED JUNE 24, 1919.

1,354,099.

Patented Sept. 28, 1920.
6 SHEETS—SHEET 1.

Inventor
E. A. Graham
by Hubert E. Peck
atty

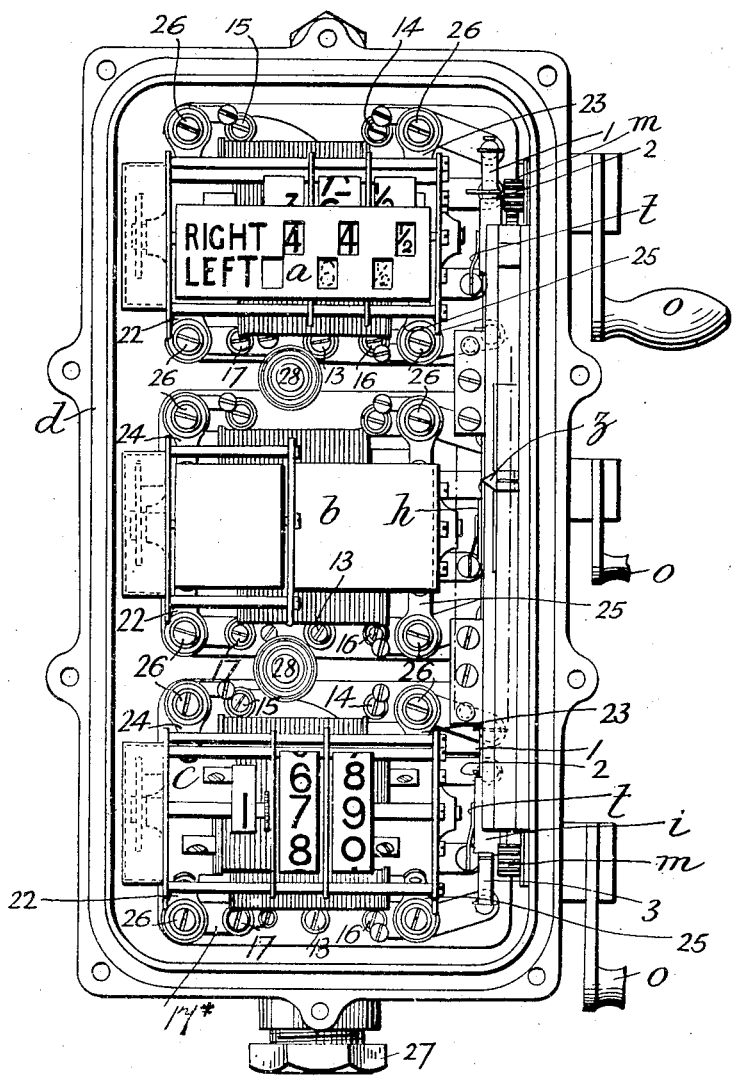
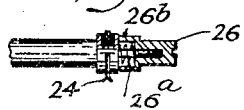

E. A. GRAHAM.
ELECTRICAL TRANSMITTING AND INDICATING APPARATUS.
APPLICATION FILED JUNE 24, 1919.

1,854,099.

Patented Sept. 28, 1920.
6 SHEETS—SHEET 3.

Inventor
E. A. Graham
by Hubert E. Peck
atty

E. A. GRAHAM.
ELECTRICAL TRANSMITTING AND INDICATING APPARATUS.
APPLICATION FILED JUNE 24, 1919.

1,354,099.

Patented Sept. 28, 1920.
6 SHEETS—SHEET 4.

Inventor—
E. A. Graham
by Hubert E. Peck
Atty

E. A. GRAHAM.
ELECTRICAL TRANSMITTING AND INDICATING APPARATUS.
APPLICATION FILED JUNE 24, 1919.
1,354,099.
Patented Sept. 28, 1920.
6 SHEETS—SHEET 5.
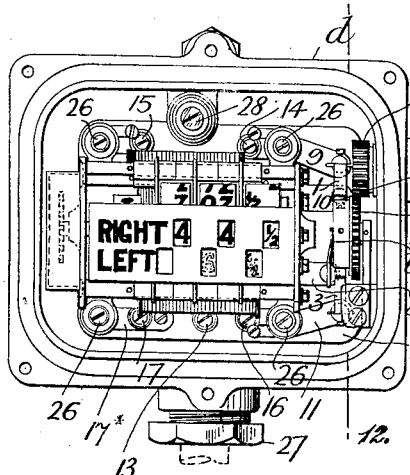
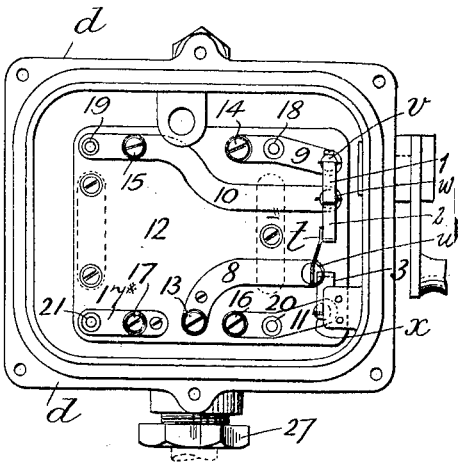
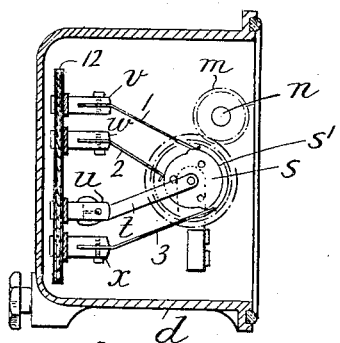
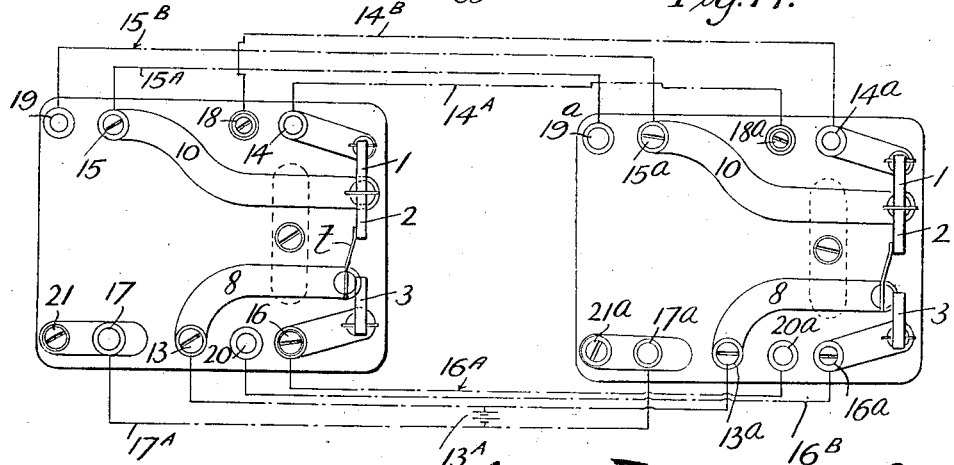

E. A. GRAHAM.
ELECTRICAL TRANSMITTING AND INDICATING APPARATUS.
APPLICATION FILED JUNE 24, 1919.

1,354,099.

Patented Sept. 28, 1920.

UNITED STATES PATENT OFFICE.

EDWARD ALFRED GRAHAM, OF BROCKLEY, LONDON, ENGLAND.

ELECTRICAL TRANSMITTING AND INDICATING APPARATUS.

1,354,099.   Specification of Letters Patent.   Patented Sept. 28, 1920.

Application filed June 24, 1919. Serial No. 306,501.

*To all whom it may concern:*

Be it known that I, EDWARD ALFRED GRAHAM, a subject of the King of Great Britain and Ireland, residing at Brockley, in the county of London, England, have invented Improvements in Electrical Transmitting and Indicating Apparatus, of which the following is a specification.

This invention has reference to improved constructions of electrical apparatus for transmitting orders, numerical data and the like from one station to another and for indicating the nature of such orders, data and the like at both stations.

The transmitting apparatus may comprise order transmitting and indicating means, or numerical data transmitting and indicating means, or both kinds of transmitting and indicating means. The receiving apparatus will generally comprise only indicating means. The indicating means in each case comprises one or more electrically operated receivers or indicating units under the control of electric impulses transmitted by the operation of a corresponding switch in the transmitting apparatus. These electrically operated receivers or indicating units are hereinafter referred to as indicating units.

One feature of transmitting and receiving apparatus according to the invention consists in the mode of mounting an indicating unit whereby a number of pillars and lugs serve both to mechanically support and electrically connect such unit.

Another feature of the apparatus consists of an improved arrangement for displaying orders in connection with the transmitting apparatus, the arrangement permitting of the removal of the cover of the apparatus for making connections or adjustments without there being any possibility of interfering with the setting of a pointer used for indicating the order to be sent. The arrangement also advantageously permits of the illumination, from within the apparatus, of a translucent plate bearing orders.

A further feature of the apparatus consists in an improved switch for transmitting the electrical impulses used to operate the indicating units both of the transmitting apparatus and of the receiving apparatus.

In the accompanying drawings which illustrate apparatus according to the invention, Figure 1 shows in front elevation transmitting apparatus embodying means for transmitting and indicating two different kinds of numerical data and also orders.

Fig. 2 is a side elevation of such apparatus, the casing containing said apparatus being shown in section on the line 2—2 of Fig. 1.

Fig. 2ª shows partly in side elevation and partly in central longitudinal section one of a number of electrical connections used in the apparatus.

Fig. 3 is a front elevation of the apparatus with the front cover removed.

Figure 7:
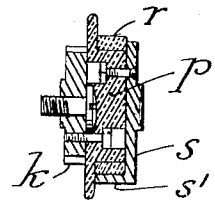
Fig. 7 is a section thereof on the line 7—7 of Fig. 6.
Figure 7A:
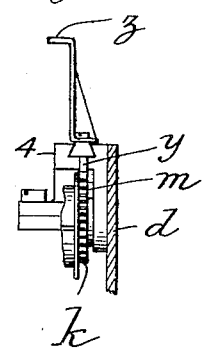
Figure 5:
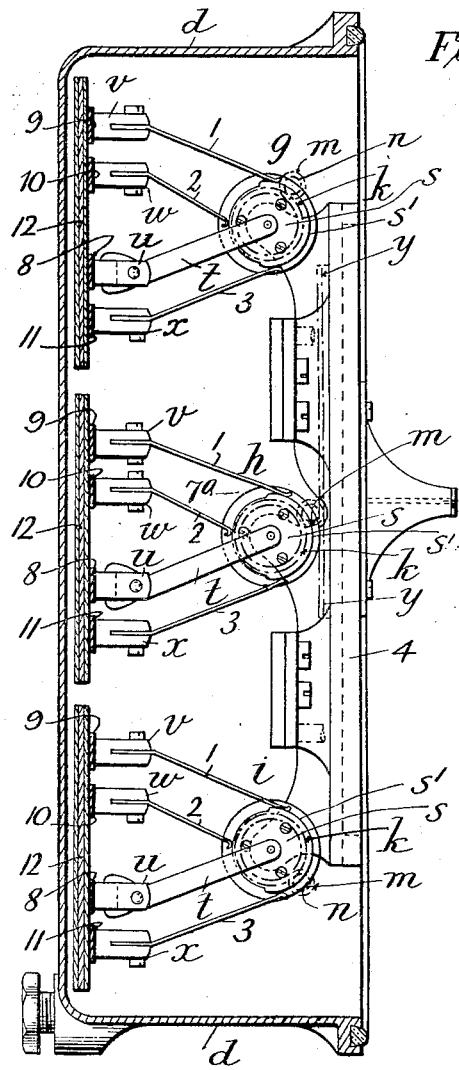
Fig. 5 is a sectional view taken at right angles to Fig. 4, showing the transmitting switches, the section being on the line 5—5 of Fig. 4.

Fig. 7ª is a sectional detail view taken on the line 7ª—7ª of Fig. 5.

Figure 8:
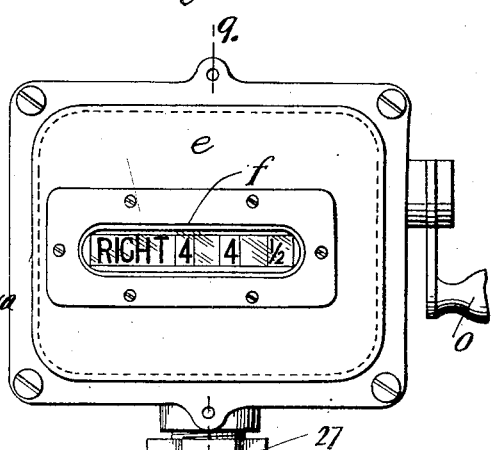
Figure 9:
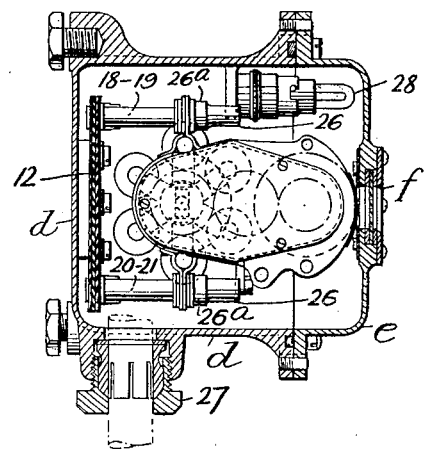

Figs. 8 to 12 inclusive are respectively similar views to Figs. 1 to 5 inclusive, showing a single transmitter with telltale indicating unit, Fig. 9 being a section on the line 9—9 of Fig. 8 and Fig. 12 a section on the line 12—12 of Fig. 10.

Figure 13:
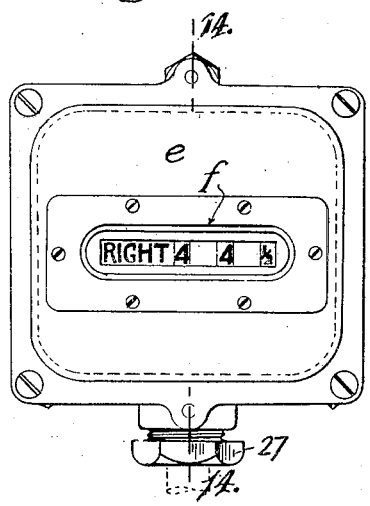
Figure 14:
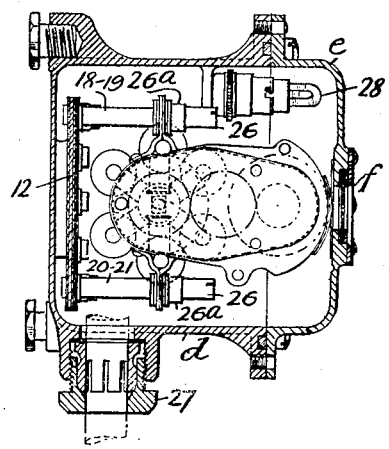
Figure 15:
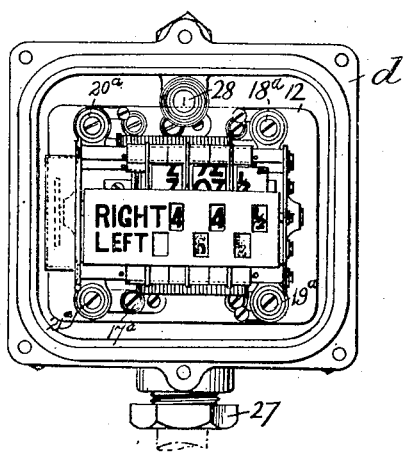

Figs. 13, 14, 15 and 16 are respectively similar views to Figs. 1, 2, 3 and 4 of a receiving apparatus, Fig. 14 being a section on the line 14—14 of Fig. 13.

Fig. 17 is a diagram hereinafter more particularly referred to.

Referring to Figs. 1 to 7, *a*, *b* and *c* are three indicating units operated by step-by-step motors mounted in a casing *d* provided with a cover *e* having glazed apertures *f*. The upper and lower indicating units *a* and *c* each indicate numerical data but of different kinds.

In the example, these indicating units are of known kind the upper one being adapted to indicate numerical data passing from a positive maximum through zero to a negative maximum and the lower one being adapted to indicate increasing numbers. Each of these indicating units is operated by a step-by-step electric motor that is combined therewith and may be constructed as described in the specification of another application for Letters Patent filed by me dated 16th May, 1919, Serial No. 297,582, Patent No. 1,343,362, issued June 15, 1920. The central indicating unit $b$ serves for indicating, through the aperture $f^1$ in the front cover of the apparatus, and, one at a time, one or other of a number of orders which, for distinction may be referred to by the letters A to J, similar orders being indicated on a fixed sheet or tablet $e^1$ of translucent material, for example opal glass, carried by the cover $e$ of the casing $d$. This indicating unit $b$ is also, in the example shown, arranged to be operated by a step-by-step motor of the kind referred to. The indicating units $a$, $b$ and $c$ correspond to similar units in receiving apparatus arranged at a distant station or stations and are designed to act as tell-tale indicating devices, for which purpose they are arranged to be connected in parallel with such distant indicating units and to be controlled by corresponding switches.

In the example, $g$, $h$ and $i$ (Fig. 5) are the rotary members of three switches for transmitting electrical impulses to the indicating units $a$, $b$ and $c$ respectively of the transmitting apparatus and also to the corresponding indicating units in three sets of receiving apparatus electrically connected thereto and located at one or more remote receiving stations. One of such receiving apparatus is shown in Figs. 13 to 16 inclusive. Where the three receiving apparatus are at one station they may, for convenience, be arranged in a single casing. Each of the rotary switch members, in the example, is rotated by a spur wheel $k$ (Fig. 5) fixed thereto and in gear with a pinion $m$ fixed on a spindle $n$ of a corresponding operating handle $o$. Each rotary switch member may conveniently comprise a flanged cylinder $p$ (Figs. 6 and 7) of insulating material, for example vulcanite, to one side of which the toothed wheel $k$ is fixed, and around which a ring $r$ of hard wear resisting insulated material, for example glass, is fixed, while, against its opposite side there is fixed a metal disk $s$ having a peripheral portion $s'$ that partly surrounds the ring $r$. Against the metal disk $s$ bears a spring contact finger $t$ and against the periphery of the rotary member bear, when a step-by-step electric motor of the kind referred to is used, three spring contact fingers 1, 2 and 3, these four contact fingers being carried by metal posts $u$, $v$, $w$ and $x$ respectively. In this case the peripheral portion $s'$ of the metal plate $s$ is made of such length that upon the rotation of the switch member, the fingers 1, 2 and 3 will bear thereon in the following order 1; 1 and 2; 2 and 3; 3; 3 and 1; 1 and so on in succession.

Figure 1:
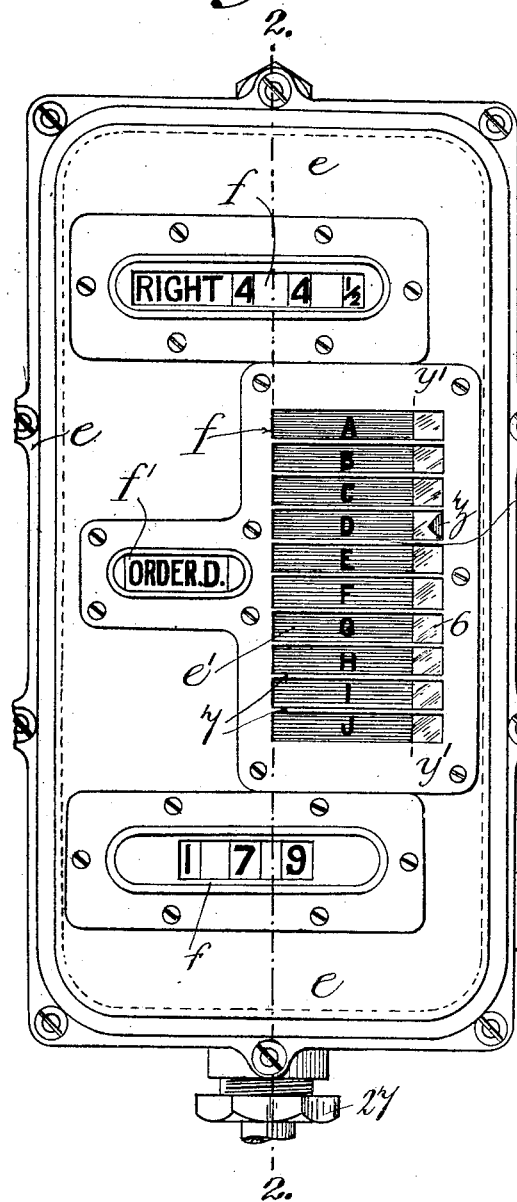
Figure 2:
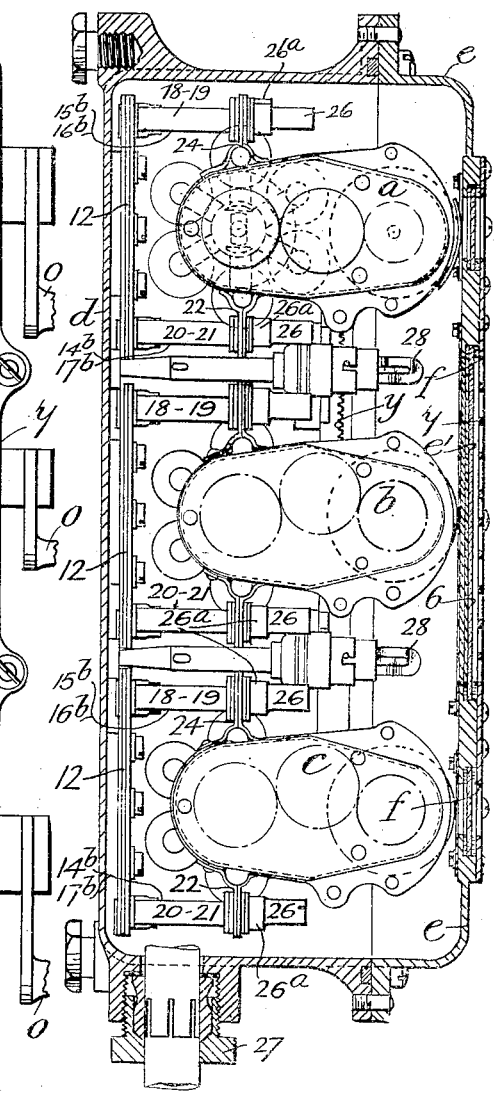

The driving pinion $m$ of the rotary switch member $h$ serves, in addition to rotating this member, to move a rack $y$ carrying a pointer $z$. The rack is arranged to move endwise in a fixed guide 4 carried by the casing $d$ and the pointer $z$ is arranged to move up and down at the rear of the fixed plate $e^1$ of translucent material on which are marked the series of orders, indicated by the letters A to J, the pointer being to one side of these orders. The glass plate $e^1$ does not extend beyond the line $y^1 y^1$ (Fig. 1) so that the pointer $z$ can be readily seen through a clear glass plate 6 which is placed in front of the translucent plate $e^1$ and which completely fills the aperture $f^1$ of the indicator $b$ in the cover $e$ of the casing $d$, and is protected by a grid 7 (Fig. 2).

As will be seen, the arrangement is such that in setting the pointer $z$ by its handle $o$ to any desired order, the switch member $h$ will be rotated so as to transmit electric impulses to the step-by-step motors of the indicating units controlled by such switch and one of which is the indicating unit $b$, and another in receiving apparatus at a distance and each of which has an indicating drum carrying on its periphery a set of orders similar to those marked on the plate $e^1$. The metal posts $u$, $v$, $w$ and $x$ (Figs. 4 and 5) carrying the contact fingers $t$, 1, 2 and 3 of each switch, are respectively connected to metal strips 8, 9, 10 and 11 that are fixed to a base piece 12 of insulating material secured to the back of the casing $d$ and to which are respectively fixed terminals 13, 14, 15 and 16. 17 is a terminal connected to another metal strip 17* fixed to the base plate 12. Terminal 13 is connected to the positive pole of a source 13$^A$ of electric energy. Terminals 14, 15 and 16 are connected by separate line conductors 14$^A$ 15$^A$ 16$^A$ to corresponding terminals 14$^a$, 15$^a$ and 16$^a$ (Fig. 16) of the step-by-step motor of an indicating unit in an associated receiving apparatus at a distant station. Terminal 17 is a negative terminal connected by a negative or return conductor 17$^A$ to the negative terminal 17$^a$ of the step-by-step motor in the corresponding receiving apparatus (Figs. 13 to 16) at a distance, such negative or return conductor 17$^A$ being connected to the negative pole of the source 13$^A$ of current. The terminals 14, 15, 16 and 17 of the transmitting instrument (Fig. 4) are also electrically connected to corresponding terminals of the step-by-step motor of the corresponding indicating unit $a$, $b$ or $c$.

Figure 4:
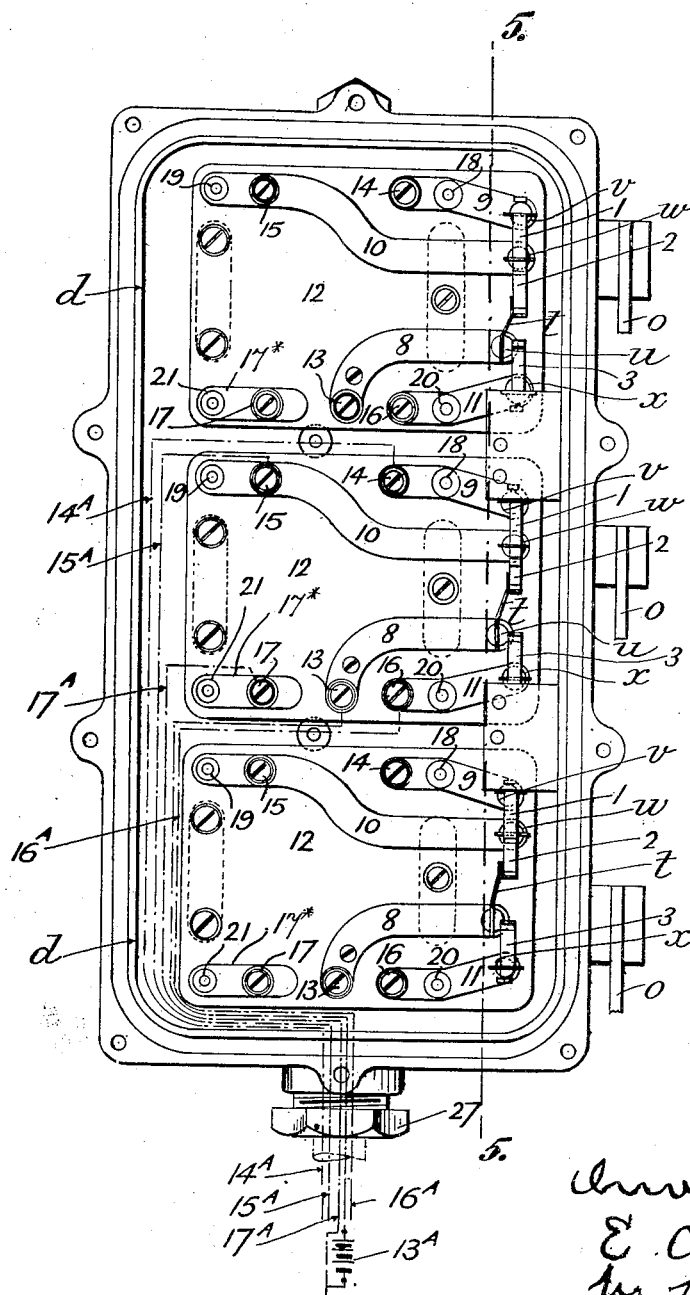
Fig. 4 is a front view showing the bases on which the various indicating units are mounted and also some electrical connections.
Figure 6:
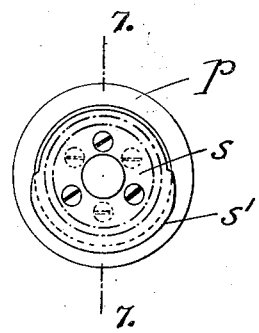
Fig. 6 shows in front elevation, one of the rotary switch devices shown in Fig. 5.

To enable the supporting means for each indicating unit $a$, $b$ and $c$ to also serve as the means for electrically connecting the step-by-step motor of such indicating unit to the terminals 14, 15, 16 and 17, there are electrically connected to the metal strips 9, 10, 11 and 17*, four metal pillars 18, 19, 20 and 21 respectively (Figs. 4, 9 and 11). These pillars are adapted to extend through and support four insulated flanged metal tubular contacts adapted to form the four terminals of the step-by-step motor of the indicating unit $a$, $b$ or $c$. Two of these tubular contacts are shown in position at $15^b$ and $17^b$ in Fig. 2 on the pillars 19 and 21 respectively. Fig. $2^a$ shows in central longitudinal section, one of the tubular contacts and associated parts. The four tubular contacts are carried by, but insulated from, four metal lugs 22, 23, 24 and 25 (Figs. 2 and 3) respectively on the metal framework of such indicating unit. As will be seen, upon removing the cover $e$ of the casing $d$, each indicating unit can be easily placed in position by passing its four tubular contacts over the pillars 18, 19, 20 and 21 respectively and then securing the contacts in place by screwing caps 26 over the screw threaded ends of the pillars. To prevent the screw caps 26 becoming loose by vibration, a spiral spring $26^a$ (Fig. $2^a$) may be compressed between each of them and the corresponding tubular contact, such spring being preferably inclosed in an enlarged part $26^b$ of the cap.

The casing $d$ is provided with one or more watertight glands 27 through which pass one or more cables containing the insulated conductors for connection to the distant indicating apparatus. Such gland, or each gland, is preferably of the kind described in the specification of British Letters Patent granted to me No. 16,155 of 1915. 28 are electric lamps arranged within the casing $d$ for illuminating the plate $e^1$.

The transmitting and indicating apparatus shown to a larger scale than Figs. 1 to 5, in Figs. 8 to 12 inclusive corresponds to that shown at the upper part of Figs. 1 to 5 inclusive and will be readily understood from the description of the latter figures.

The transmitting and indicating apparatus shown at the lower part of Figs. 1 to 5 is similar in general construction and arrangement to that shown at the central and upper parts of Figs. 1 to 5 but the indicating unit is adapted, as hereinbefore stated, to indicate increasing numbers, that is to say it is a counter.

Figure 16:
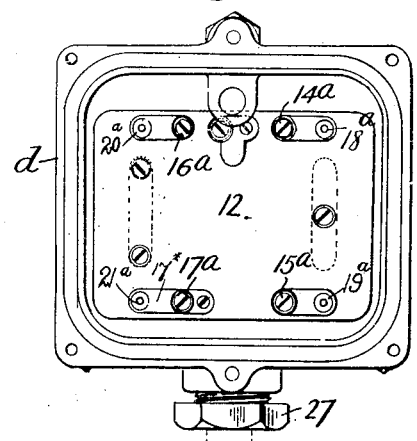

The receiving apparatus shown in Figs. 13 to 16 inclusive comprises an indicating unit constructed and mounted like either of those shown in Figs. 1 to 5 inclusive, there being of course in this case, no transmitting switch. The terminals $14^a$, $15^a$, $16^a$ and $17^a$ in such receiving apparatus are, as shown in Fig. 16 connected respectively by metal strips to four metal pillars $18^a$, $19^a$, $20^a$ and $21^a$ to which the terminals of the electric motor of the indicating unit in such receiving apparatus are connected like the terminal of the motor of each indicating unit in the transmitting apparatus hereinbefore described. The arrangement will be readily understood from the foregoing description without further explanation.

In the examples illustrated and herein described it will be understood that each of the indicating elements in the transmitting instrument is associated and in electrical connection with the corresponding transmitting switch, and the indicating unit of the corresponding receiving instrument is also electrically connected with the switch of the transmitting instrument as hereinbefore described, so that on operating the switch both indicating elements will be simultaneously actuated.

In cases where a "repeat back" is required from the receiving instrument, it is obvious that both transmitting and receiving instruments will be identical in arrangement, both being provided with a switching device similarly operated and in electrical connection with the corresponding indicating unit of the distant or companion instrument. To meet such requirements, the local indicating unit is not electrically connected with the local transmitting switch, but with the switch of the remotely situated instrument.

Fig. 17 shows, diagrammatically, an arrangement of this kind wherein each instrument is provided with an electric transmitting switch of the kind hereinbefore described. The terminals 14, 15 and 16 of the switch of one apparatus are connected by line wires $14^A$, $15^A$ and $16^A$ to the contact pillars $18^a$, $19^a$ and $20^a$ of the motor of the indicating unit in the second apparatus and the terminals $14^a$, $15^a$ and $16^a$ of the switch of the second apparatus are connected by line wires $14^B$, $15^B$ and $16^B$ to the contact pillars 18, 19 and 20 of the motor of the first instrument. The two positive terminals 13 and $13^a$ of the two instruments are connected to the positive pole of an electric generator $13^A$ common to them and the two contact pillars 21 and $21^a$ of the two instruments are connected through terminals 17 and $17^a$ and a line wire $17^A$ to the negative pole of the electric generator $13^A$. In this case the contact pillars 18, 19 and 20 in one instrument and the contact pillars $18^a$, $19^a$ and $20^a$ in the other instrument are insulated from each other and from the terminals 14, 15 and 16 and $14^a$, $15^a$ and $16^a$ of the two instruments. By this arrangement the switch of each instrument will operate only the indicating unit of the other instrument.

The rotary electric switch is not shown in Figs. 4, 11 and 17 but only the switch contact fingers, in order not to complicate these figures.

It will be further understood that the arrangements as herein described and illustrated may be adapted for use in connection with a step-by-step transmitting and receiving system, employing a lesser or greater number of line wires or conductors than the four in number, between each independent transmitter and receiver herein referred to, the connections and electrical details being modified accordingly without departing from the essential features hereof.

What I claim is:—

1. Electrical apparatus of the kind referred to, comprising an indicating unit embodying an electric motor, switch mechanism for determining the operation of such motor, a two part casing, an insulating base in one part of the casing, upon which a portion of the switch mechanism is mounted, the remainder being carried by the said part of the casing; terminal pillars upon such base, and tubular contacts associated with the motor but insulated from the indicating unit, adapted to be engaged by the terminal pillars and to support the indicating unit in a manner that will permit it to be placed in position with the motor thereof in proper electrical connection both with the terminal pillars and with the portion of the switch mechanism upon the base, or to be removed, when the casing is open.

2. Electrical apparatus of the kind referred to, comprising an indicating unit embodying an electric motor, switch mechanism for determining the operation of such motor, a two part casing, an insulating base in one part of the casing, upon which a portion of the switch mechanism is mounted, the remainder being carried by the said part of the casing, terminal pillars upon such base, each having a shouldered and screw threaded extremity, a set of tubular contacts for connection to the motor, corresponding in number to the pillars and adapted to be received by the screw threaded extremities thereof, insulating means interposed between the contacts and the indicating unit, and screw caps clamping the contacts to the pillars.

3. Electrical apparatus of the kind referred to, comprising an indicating unit embodying an electric motor, switch mechanism for determining the operation of such motor, a two part casing, an insulating base in one part of the casing upon which a portion of the switch mechanism is mounted the remainder being carried by the said part of the casing, terminal pillars upon such base, each having a shouldered and screw threaded extremity, a set of tubular contacts for connection to the motor, corresponding in number to the pillars and adapted to be received by the screw threaded extremities thereof, insulating means interposed between the contacts and the indicating unit, screw caps adapted to clamp the contacts to the pillars and springs interposed between the contacts and such screw caps.

Signed at London, England, this third day of June, 1919.

EDWARD ALFRED GRAHAM.